(12) United States Patent
Crook

(10) Patent No.: US 6,487,281 B1
(45) Date of Patent: Nov. 26, 2002

(54) METHOD OF PROCESSING A FAX/VOICE CALL

(75) Inventor: John Crook, Austin, TX (US)

(73) Assignee: Dialogic Corporation, Parsippany, NJ (US)

(*) Notice: Subject to any disclaimer, the term of this patent is extended or adjusted under 35 U.S.C. 154(b) by 0 days.

(21) Appl. No.: 09/488,860

(22) Filed: Jan. 21, 2000

(51) Int. Cl.⁷ .............................................. H04M 11/00
(52) U.S. Cl. ................................ 379/100.15; 379/93.09
(58) Field of Search .................... 379/100.15–100.17, 379/100.12, 100.01, 93.09, 93.11, 902, 93.12

(56) References Cited

U.S. PATENT DOCUMENTS

| 4,800,439 A | * | 1/1989 | Yoshino | ................ 379/100.16 |
| 4,850,008 A | * | 7/1989 | Berg et al. | ................ 379/93.11 |
| 4,868,865 A | * | 9/1989 | Ogawa et al. | ......... 379/100.16 |
| 5,608,791 A | * | 3/1997 | Grecco et al. | ........... 379/93.12 |

FOREIGN PATENT DOCUMENTS

JP          63-182952        *   7/1988

* cited by examiner

Primary Examiner—Wing Chan
(74) Attorney, Agent, or Firm—Kaplan & Gilman, LLP

(57) ABSTRACT

A method of processing a call in which two or more independent application may simultaneously process a call. Upon detection of an event indicating that one or more of the applications are inapplicable, the inapplicable applications are simply discontinued.

17 Claims, 2 Drawing Sheets

METHOD OF PROCESSING A FAX/VOICE CALL

TECHNICAL FIELD

This invention relates to a call processing system, more particularly, to a method of processing a call that may be one of many types. In a preferred embodiment the invention is utilized to process a call comprising either a fax call or a voice call so that a human caller will be immediately answered without delay when there is a voice call.

BACKGROUND OF THE INVENTION

Presently, many new techniques (e.g., CT media), have been developed to provide integrated call services in a single call processing system. It is very common that a single call processing system provides at least both voice call and fax services. In such a system, usually there is a detecting program running to assess the type of a call (i.e., to decide whether the call is a fax request or a human voice call). After the type of the call is deduced, the call is handed off to a proper call processing application which will answer and process the call. Usually the process for assessing the type of the call will last several seconds. This is not too bad if the call is a fax request, but it can be annoying if it is a voice call since the caller has to wait for several seconds before getting an answer.

In order to answer a call immediately, an integrated call processing application is used which is capable of processing both a voice call and a fax call. However, this call processing application needs to be aware that the call may be a voice or fax call. Therefore, the application is cumbersome and expensive as compared to single-functional processing applications. The problem is even greater with respect to calls that may be processed by more than two applications.

SUMMARY OF THE INVENTION

The object of the present invention is to provide a method of processing a call in which two or more different call processing applications may simultaneously operate on a single call. The applications have no knowledge of each other. During the processing of the call, if it is determined that one or more of the applications is inapplicable to the type of call in question, then that application drops out. The technique avoids the delay typically encountered until the type of call is determined.

In an exemplary system that does voice and fax calls, it is no longer necessary to answer the call and wait while a detection algorithm determines if there is a voice or fax call. In accordance with the invention, a voice processing application always runs immediately after the call is received, regardless of whether the call is a fax call or a voice call. A detecting application runs simultaneously to detect whether there is a fax tone in the call while the voice processing application is answering the call by playing prompts. If a fax tone is heard by the detecting application, the call is switched from the voice processing application to a fax processing application, and the latter will answer the call while the former drops out. If there is no fax tone detected, the voice processing application simply continues its work without awareness of what other applications are doing. Thus, if the caller is a human being, he will be immediately and continuously answered by the voice processing application and does not have to wait for several seconds when the system is assessing the type of the call.

Furthermore, separate call processing applications may be used, one for processing voice calls, the other for processing fax calls. The separate applications may be from different vendors, and may operate totally independently of each other. No single application needs to be capable of processing both fax and voice calls. By independent applications, we mean applications that may operate without knowledge of each other, even on different hardware if desired.

In one embodiment, the voice processing application is a Integrated Voice Response (IVR) application. A FaxDetector application may be used both to receive a call and to detect a fax tone in the call.

Other features and advantages the invention will be clearer after reading the following detailed description with reference to the drawings in which:

DETAILED DESCRIPTION OF THE INVENTION

Figure 1:
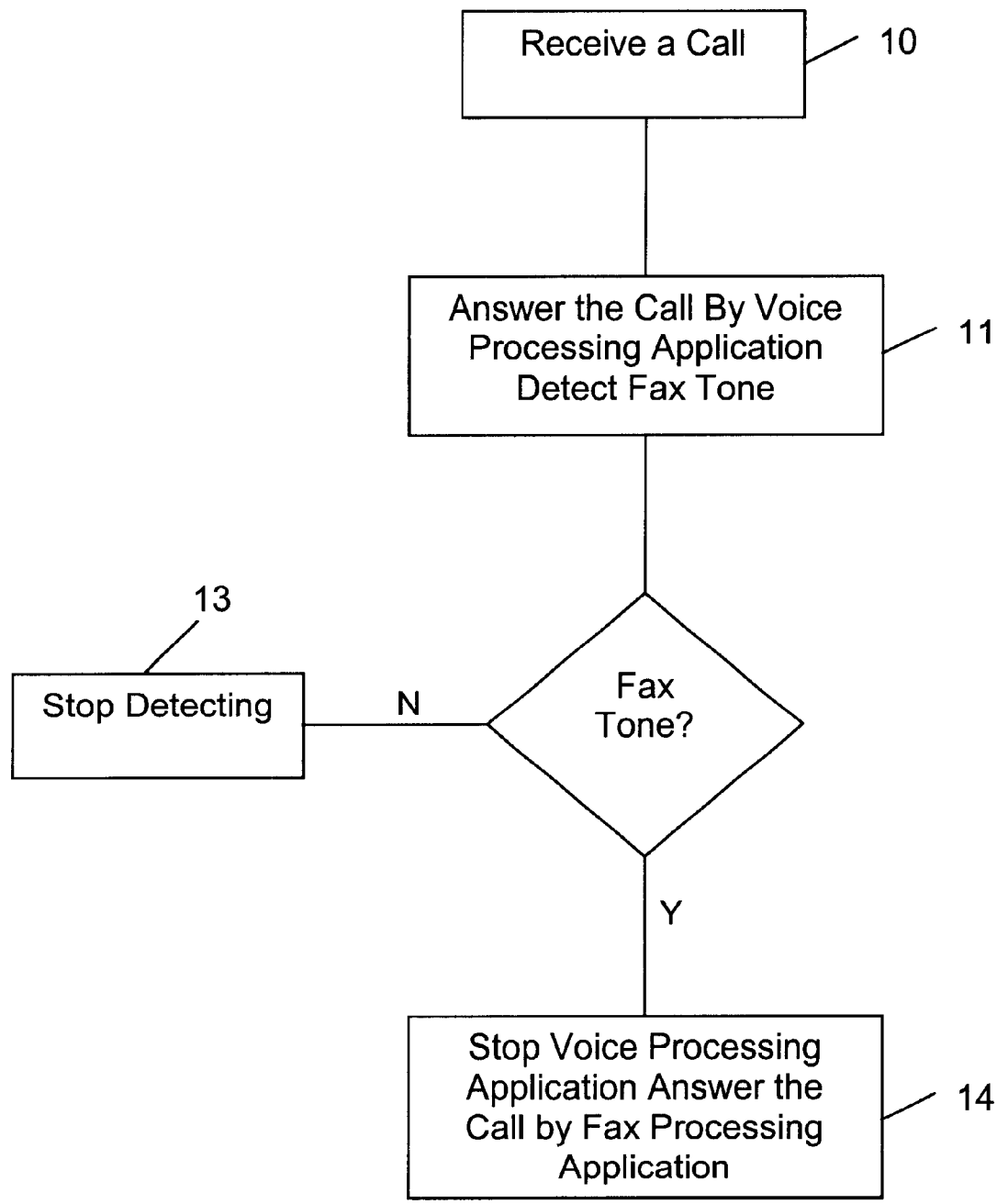
FIG. 1 is a schematic flow chart showing the method of present invention.

In the exemplary embodiment of the invention shown in FIG. 1, a fax application and a voice application are used. The method of the present invention is shown in a flow chart form. After a call is received at step 10, a voice processing application immediately answers the call at step 11 (e.g., by playing prompts), without knowing whether the call is a fax call or a voice call. Simultaneously, a detecting application also runs at step 11 to detect whether there is a fax tone in the call.

If there is no fax tone detected within a predetermined time period (e.g., 4 seconds), the detecting application stops running at step 13 and the voice processing application, which has begun processing the call, continues its work without interruption.

If, on the other hand, a fax tone is detected by the detecting application, the voice processing application stops running at step 14, and the call is switched to a fax processing application. The call is now answered by the fax processing application.

In such an arrangement, whether the incoming call is a fax call or a voice call, the voice processing application always runs to answer the call immediately, while at the same time the detecting application attempts to detect fax tone. If the call happens to be a voice call, the human caller receives an answer from the system immediately and does not have to wait several seconds of silence. The voice processing application will continuously answer the call if there is no fax tone detected, so the caller will not be annoyed by any interruption or pause.

A complicated fax/voice dual function application is not necessary for the present invention. A single voice processing application and a single fax processing application carry out their respective functions and do not need to be concerned with each other. Therefore, these applications may be developed independently. Any existing applications may be used without any modification to them.

A call processing system using CT media, available from the assignee of the present invention, is used here as an exemplary embodiment. The method of the invention can be easily implemented in a call processing system using the group handoff and group retrieve functionality in CT media where multiple independently developed applications operate on a call simultaneously. This technique is described in U.S. Pat. No. , 5,608,791, hereby incorporated by reference.

There are many modifications available to a person skilled in the art without departing of the spirit of the invention. For example, even after the specified time period, the detecting step for the fax tone may continue all the way while the voice processing application is answering the call. Thus, whenever a fax tone is detected, the call may be switched from the voice processing application to the fax processing application. This is useful when a human caller wants to stop his voice call to send a fax. All these modifications are deemed to be within the scope of the claims.

Figure 2:
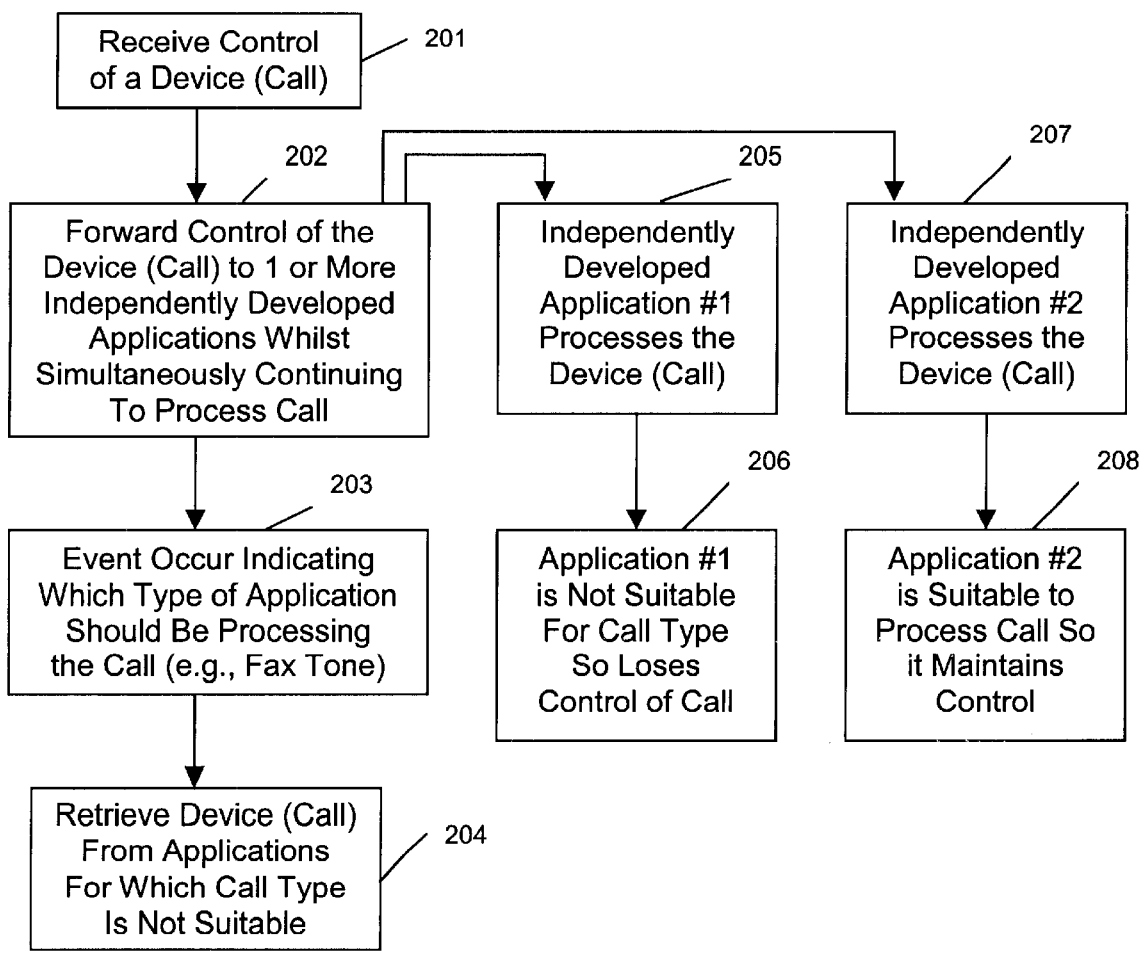
FIG. 2 is a more general embodiment of the invention.

FIG. 2 shows a more generalized embodiment of the present invention. The flow chart of FIG. 2 includes the block 201 for receiving a call and block 202 for forwarding control of the call to one or more independently developed applications. Applications 205 and 207 simultaneously process the call without knowledge of each other. Importantly, applications 205 and 207 may be independently developed by different vendors.

As call processing proceeds, block 203 represents an event which indicates that a particular type of application should be processing the call. Thereafter, the block associated with the particular applications 206 and 208 are dropped out of the call if they are not appropriate for processing that call. The call is then assigned at block 204 to be processed only by the application that is appropriate for that particular call.

Of course, while two applications are shown, plural applications may also simultaneously act upon a call. Additionally, while in the normal mode, all applications except one would drop out after the event is detected at block 203, it is possible to have multiple points in the flow chart where applications drop out. For example, a call may be initially processed by four independently developed applications. Upon the detection of a first event, one of those may cease operating while three other applications continue processing the call. Thereafter, a second event may require that one or two of the remaining three drop out of the call, leaving one or two to finish processing the call. Other variations are possible given the present technology.

While the above describes the preferred embodiment of the invention, various modifications and additions will be apparent to those of skill in the art. These additions are intended to be covered by the following claims.

What is claimed is:

1. A method of processing a telephone call in a call processing system, the system comprising a plurality of call processing applications, the method comprising the steps of:
   receiving the telephone call;
   processing the call simultaneously with at least two different independent applications immediately after said telephone call is received,
   detecting, during said processing, an event that indicates that at least one of said at least two different independent applications is inapplicable to the type of call being processed, and
   discontinuing the processing of the call by said at least one application when said step of detecting indication that said at least one application is inapplicable to said type of call being processed.

2. The method of claim 1 wherein said at least two different independent applications include at least a facsimile application and a voice application.

3. The method of claim 1 wherein upon detection of a first event, a first application discontinues processing said call, and upon detection of a second event, a second application discontinues processing the call while a third independent application continues processing said call.

4. A method of processing a call either of fax or of voice, comprising the steps of:
   a) receiving said call;
   b) answering said call by running both a voice pressing application and a fax processing application immediately after said call is received, no matter if said call is a fax call or a voice call; said voice processing application and said fax processing application being independent;
   c) detecting whether there is a fax tone in said call; and
   d) if not, ceasing operation said fax processing application.

5. The method of claim 4, wherein said step c) is implemented for a specified time period.

6. The method of claim 4, wherein said step d) includes the step of stopping said voice processing application while running said fax processing application.

7. The method of claim 6, wherein said voice processing application is an Integrated Voice Response application.

8. The method of claim 4, wherein said step a) is carried out by a fax detecting application that also carries out step c).

9. The method of claim 8, wherein said fax detecting application is a single FaxDetector application.

10. A call processing sewn for processing a call of either fax or voice, comprising:
    a receiving means for receiving said call;
    a detecting means for detecting whether there is a fax tone in said call;
    a voice processing application for processing a voice call;
    a fax processing application for processing a fax call;
    means for running both said voice processing application and said fax processing application so as to answer said call immediately after said call is received no matter said call is a voice call or a fax call;
    means for stopping said voice comprising application if a fax tone is detected in said call; and
    means for continuing said fax processing application to process said call if a fax tone is detected, said voice and fax processing applications being independent.

11. A call processing system for processing a call of either fax or voice, comprising:
    a receiving means for receiving said call,
    a detecting means for detecting whether there is a fax tone in said call;
    a voice processing application for processing a voice call and a fax processing application for processing a fax call, said voice processing application being independent from said fax processing application; and
    means for switching said call to said voice processing application and said fax processing application substantially immediately after said call is received so as to answer said call by both said voice processing application and said fax processing application, regardless of whether said call is a voice call or a fax call.

12. A call processing system of claim 11 wherein said receiving means and detecting means are integrated as a single apparatus or application.

13. A call processing system of claim 12 wherein said single apparatus is a FaxDetector apparatus or a FaxDetector application.

14. A call processing system of claim 13 wherein said voice processing application is a Integrated Voice Response application.

15. A call processing system of claim 14 wherein said fax processing application is a fax service application.

16. A method of processing a call either of fax or of voice, comprising the steps of:
   a) receiving said call;
   b) answering said call by both a voice processing application and a fax processing application immediately after receiving said call, said voice processing application and said fax processing application being independent of each other.

17. A method of claim 16, further including the steps of:
   c) detecting whether there is a fax tone in said call; and
   d) if a fax tone is detected within a specified time period, stopping said voice processing application, otherwise stopping said fax processing application.

* * * * *

UNITED STATES PATENT AND TRADEMARK OFFICE
CERTIFICATE OF CORRECTION

PATENT NO.    : 6,487,281 B1
DATED         : November 26, 2002
INVENTOR(S)   : John Crook It is certified that error appears in the above-identified patent and that said Letters Patent is hereby corrected as shown below:

Title page,
Item [57], ABSTRACT,
Line 1, correct "moreindependent" to read -- more independent --;
Line 2, correct "application" to read -- applications --;

Column 2,
Line 9, correct "a" to read -- an --;
Line 13, after "advantages" insert -- of --;
Line 48, after "detect" insert -- a --;
Line 51, after "wait" insert -- through --;

Column 3,
Line 60, correct "indication" to read -- indicates --;

Column 4,
Line 7, correct "pressing" to read -- processing --;
Line 11, after "operation" insert -- of --;
Line 29, correct "sewn" to read -- system --;
Line 41, correct "comprising" to read -- processing --;

Signed and Sealed this

Seventeenth Day of June, 2003

JAMES E. ROGAN
*Director of the United States Patent and Trademark Office*